(12) United States Patent
Weidl et al.

(10) Patent No.: US 9,109,054 B2
(45) Date of Patent: Aug. 18, 2015

(54) PROCESS FOR EMULSION POLYMERIZATION

(71) Applicant: BASF SE, Ludwigshafen (DE)

(72) Inventors: Christian Hubert Weidl, Speyer (DE); Ronald Klagge, Erkrath (DE); Uwe Held, Velbert (DE); Marta Reinoso Garcia, Dossenheim (DE); Thomas Mausberg, Haan (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/371,933

(22) PCT Filed: Jun. 11, 2013

(86) PCT No.: PCT/EP2013/061964
§ 371 (c)(1),
(2) Date: Jul. 11, 2014

(87) PCT Pub. No.: WO2014/001077
PCT Pub. Date: Jan. 3, 2014

(65) Prior Publication Data
US 2014/0378636 A1 Dec. 25, 2014

(30) Foreign Application Priority Data
Jun. 25, 2012 (EP) ..................... 12173447

(51) Int. Cl.
| C08F 2/00 | (2006.01) |
| B01F 3/08 | (2006.01) |
| C11D 17/00 | (2006.01) |
| C11D 1/72 | (2006.01) |
| C08F 2/44 | (2006.01) |
| C08F 2/24 | (2006.01) |
| C08F 2/30 | (2006.01) |
| B01F 17/00 | (2006.01) |

(52) U.S. Cl.
CPC ............... *C08F 2/44* (2013.01); *B01F 17/0021* (2013.01); *C08F 2/24* (2013.01); *C08F 2/30* (2013.01)

(58) Field of Classification Search
CPC ............... C08F 2/24; C08F 2/44; C08F 2/30; B01F 17/0021
USPC ............. 510/506, 421, 422; 526/212; 516/20
See application file for complete search history.

(56) References Cited

U.S. PATENT DOCUMENTS

| 5,158,922 A | 10/1992 | Hinney et al. |
| 5,348,993 A | 9/1994 | Daeumer et al. |
| 6,057,284 A * | 5/2000 | Baur et al. .................. 510/506 |
| 6,963,014 B1 | 11/2005 | Zeller et al. |
| 2004/0254295 A1 | 12/2004 | Stanger et al. |
| 2005/0215452 A1 | 9/2005 | Ruland et al. |
| 2007/0225189 A1 | 9/2007 | Dailey et al. |
| 2008/0103083 A1 | 5/2008 | Dailey et al. |
| 2009/0023820 A1 | 1/2009 | Dailey et al. |
| 2011/0260101 A1 | 10/2011 | Rittig et al. |
| 2013/0303430 A1 | 11/2013 | Reinoso Garcia et al. |

FOREIGN PATENT DOCUMENTS

| DE | 197 05 753 | 8/1998 |
| EP | 0 558 980 | 9/1993 |
| WO | 98 03612 | 1/1998 |
| WO | 0 74845 | 12/2000 |
| WO | 01 36356 | 5/2001 |
| WO | 01 64772 | 9/2001 |
| WO | 03 091192 | 11/2003 |
| WO | 2007 096292 | 8/2007 |
| WO | 2010 070088 | 6/2010 |

OTHER PUBLICATIONS

International Search Report Issued Aug. 12, 2013 in PCT/EP13/061964 filed Jun. 11, 2013.

* cited by examiner

*Primary Examiner* — William Cheung
(74) *Attorney, Agent, or Firm* — Oblon, McClelland, Maier & Neustadt, L.L.P.

(57) ABSTRACT

Process for polymerizing at least one monomer under emulsion polymerization conditions, characterized in that the (co) monomers are selected from vinyl aromatic compounds, ethylenically unsaturated carboxylic acids with 3 to 10 carbon atoms, $C_1$-$C_{10}$-alkyl esters of ethylenically unsaturated carboxylic acids with 3 to 10 carbon atoms, 1,3-butadiene, and a-olefins bearing in the range of from 10 to 250 carbon atoms per molecule, in pure form or as mixture with isomers, and using a surfactant mixture comprising (A) an alkoxylation product of at least one alkanol (a), characterized in that alkanol (a) has 6 to 12 carbon atoms per molecule and the average number of alkylene oxide units per molecule in alkoxylation product (A) assumes a value in the range of from 35 to 55, the alkylene oxide units are selected from $C_2$-$C_{10}$-alkylene oxide units and alkanol (a) has an average degree of branching of at least 1; and (B) an alkoxylation product of at least one alkanol (b), characterized in that alkanol (b) has 13 to 19 carbon atoms per molecule and the average number of alkylene oxide units per molecule in alkoxylation product (B) assumes a value in the range of from 35 to 55, the alkylene oxide units are selected from $C_2$-$C_{10}$-alkylene oxide units, or (C) an alkoxylation product of at least one linear $C_{12}$-$C_{22}$-alkyl alcohol (c), characterized in that the average number of alkylene oxide units per molecule in alkoxylation product (C) assumes a value in the range of from 35 to 55, the alkylene oxide units are selected from $C_2$-$C_{10}$-alkylene oxide units.

20 Claims, No Drawings

PROCESS FOR EMULSION POLYMERIZATION

The present invention is referring to a process for polymerizing at least one monomer under emulsion polymerization conditions, characterized in that the (co)monomers are selected from vinyl aromatic compounds, ethylenically unsaturated carboxylic acids with 3 to 10 carbon atoms, $C_1$-$C_{10}$-alkyl esters of ethylenically unsaturated carboxylic acids with 3 to 10 carbon atoms, 1,3-butadiene, and α-olefins bearing in the range of from 10 to 250 carbon atoms per molecule, in pure form or as mixture with isomers, and using a surfactant mixture comprising (A) an alkoxylation product of at least one alkanol (a), characterized in that alkanol (a) has 6 to 12 carbon atoms per molecule and the average number of alkylene oxide units per molecule in alkoxylation product (A) assumes a value in the range of from 35 to 55, the alkylene oxide units are selected from $C_2$-$C_{10}$-alkylene oxide units and alkanol (a) has an average degree of branching of at least 1; and (B) an alkoxylation product of at least one alkanol (b), characterized in that alkanol (b) has 13 to 19 carbon atoms per molecule and the average number of alkylene oxide units per molecule in alkoxylation product (B) assumes a value in the range of from 35 to 55, the alkylene oxide units are selected from $C_2$-$C_{10}$-alkylene oxide units, or (C) an alkoxylation product of at least one linear $C_{12}$-$C_{22}$-alkyl alcohol (c), characterized in that the average number of alkylene oxide units per molecule in alkoxylation product (C) assumes a value in the range of from 35 to 55, the alkylene oxide units are selected from $C_2$-$C_{10}$-alkylene oxide units.

Furthermore, the present invention refers to a surfactant mixture which is useful for emulsion polymerization.

Emulsion polymerization processes are well-known methods for the syntheses of highmolecular weight polymers and copolymers. Advantages of emulsion polymerization processes are generally favourable polymerization reaction kinetics and the capability of controlling the morphology of the resulting polymers (or copolymers). The recipes for emulsion polymerization processes can be very complicated and require multiple ingredients. Starter systems, surfactants, co-surfactants, protective colloids and (co)monomers can be combined in various ways depending on the desired products, the reaction vessel geometry and the like.

In WO 2007/096292 and WO 2010/070088, surfactant systems have been disclosed which is useful for many applications such as hard surface cleaning or emulsion polymerization. It has been demonstrated that the surfactant combination of WO 2007/096292 is good for emulsifying sun flower oil.

In some cases of emulsion polymerization, however, the ingredients show problems at special state of polymerization. When diluting them with water prior to use in the actual polymerization vessel, they tend to build up so-called liquid crystallization phases, commonly referred to as gel phases. Such gel phases are generally undesired because they may form particles that are solidified to a major extent. In such solidified state, the polymerization reaction cannot be effected. Re-liquefying such particles maybe rather tedious and require heat or time.

It was an objective of the present invention to provide an emulsion polymerization process that can be performed smoothly, and in which gelling of the surfactant system is not a problem.

Accordingly, the process defined at the outset has been found, which will—in the context of the—present invention—also be referred to as inventive polymerization process.

The term emulsion polymerization will be used even when two or three or more comonomers are employed. Thus, the term emulsion polymerization therefore also includes emulsion copolymerization.

Suitable (co)monomers for the inventive polymerization process are selected from vinyl aromatic compounds, ethylenically unsaturated carboxylic acids with 3 to 10 carbon atoms, $C_1$-$C_{10}$-alkyl esters of ethylenically unsaturated carboxylic acids with 3 to 10 carbon atoms, ethylenically unsaturated carboxylic acids with 3 to 10 carbon atoms, and α-olefins bearing in the range of from 10 to 250 carbon atoms per molecule, in pure form or as mixture with isomers.

Preferred examples for vinyl aromatic compounds are α-methylstyrene, para-methylstyrene, α-n-butylstyrene, para-n-butylstyrene, 4-n-decylstyrene and in particular styrene.

In one embodiment of the present invention, ethylenically unsaturated carboxylic acids with 3 to 10 carbon atoms can be selected from 2-butenoic acid and in particular from methacrylic acid and acrylic acid.

In one embodiment of the present invention, ethylenically unsaturated carboxylic acids with 3 to 10 carbon atoms are selected from ethylenically unsaturated dicarboxylic acids with 4 to 10 carbon atoms such as fumaric acid, itaconic acid and in particular maleic acid.

In one embodiment of the present invention, $C_1$-$C_{10}$-alkyl esters of ethylenically unsaturated carboxylic acids with 3 to 10 carbon atoms are selected from compounds of the general formula I

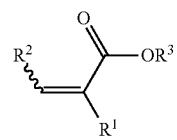

the integers being defined as follows:

$R^1$ and $R^2$ are identical or different and are selected from hydrogen and $C_1$-$C_{10}$-alkyl, preferably methyl and ethyl and more preferably hydrogen, $R^3$ is selected from $C_1$-$C_{10}$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, isodecyl and n-decyl; particularly preferably n-butyl, ethyl and 2-ethylhexyl.

In one embodiment of the present invention, $R^2$ is selected from hydrogen and $R^1$ is selected from hydrogen and methyl.

In one embodiment of the present invention, (co)monomers are selected from α-olefins bearing in the range of from 10 to 250 carbon atoms per molecule, in pure form or as mixture with isomers, branched or non-branched, such as, but not limited to α-decene, α-dodecene, α-tetradecene, α-hexadecene, α-octadecene, and α-eicosene, and from propylene oligomers and from so-called reactive polyisobutene.

In the context of the present invention, oligomers of propylene and of isobutene (so-called reactive polyisobutene) are selected from oligomers of at least 4 units of propylene—or at least 3 units of isobutene, said oligomers bearing an ethylenic double bond, which may be present in the form of a vinyl, vinylidene or alkylvinylidene group, preferably in form of mixtures.

In one embodiment of the present invention, in α-olefins bearing in the range of from 10 to 250 carbon atoms per molecule, in pure form or as mixture with isomers, the number of carbon atoms is an average value, preferably a number average, determined, e.g., by determining the average molecular weight of such monomer, for example by gel permeation chromatography (GPC).

In one embodiment of the present invention, at least two different comonomers from two of the different groups of comonomers (vinyl aromatic compounds, ethylenically unsaturated carboxylic acids with 3 to 10 carbon atoms, $C_1$-$C_{10}$-alkyl esters of ethylenically unsaturated carboxylic acids with 3 to 10 carbon atoms, ethylenically unsaturated carboxylic acids with 3 to 10 carbon atoms, and α-olefins) are being selected.

In one embodiment of the present invention, at least three different comonomers from at least two of the different groups of comonomers (vinyl aromatic compounds, ethylenically unsaturated carboxylic acids with 3 to 10 carbon atoms, $C_1$-$C_{10}$-alkyl esters of ethylenically unsaturated carboxylic acids with 3 to 10 carbon atoms, ethylenically unsaturated carboxylic acids with 3 to 10 carbon atoms, and α-olefins) are being selected.

The inventive polymerization process can be selected from various embodiments of emulsion polymerization procedures, for example a batch process (batchwise) or semicontinuous or fully continuous processes, such as feed processes.

Seed procedures are also suitable. By means of a seed procedure, copolymers according to the invention which have a particularly readily reproducible particle diameter distribution can be produced particularly well.

Usually, polymerization is effected using at least one initiator. In one embodiment of the present invention, the (co)polymerization is started by an initiator selected from peroxides or systems containing at least one peroxide, such as redox initiators containing at least one peroxide. Examples of suitable peroxides are alkali metal peroxodisulfates, such as, for example, sodium peroxodisulfate or ammonium peroxodisulfate, hydrogen peroxide, organic peroxides, such as diacetyl peroxide, di-tert-butyl peroxide, diamyl peroxide, dioctanoyl peroxide, didecanoyl peroxide, dilauryl peroxide, dibenzoyl peroxide, bis(o-toluyl) peroxide, succinyl peroxide, tert-butyl peracetate, tert-butyl permaleate, tert-butyl perisobutyrate, tert-butyl perpivalate, tert-butyl peroctanoate, tert-butyl perneodecanoate, tert-butyl perbenzoate, di-tert-butyl peroxide, tertbutyl hydroperoxide, cumyl hydroperoxide, tert-butyl peroxy-2-ethylhexanoate and diisopropyl peroxydicarbamate. Azo compounds, such as, for example, azobisisobutyronitrile, azobis(2-amidopropane) dihydrochloride and 2,2'-azobis(2-methylbutyronitrile) are also suitable.

Redox initiators are likewise suitable, for example comprising peroxides and an oxidizable sulfur compound. Examples are combinations of at least one Fe(II) compound such as $FeSO_4$ and at least one peroxide such as $H_2O_2$. Further examples are combinations of $Na_2S_2O_8$ and $Na_2S_2O_5$, combinations of $Na_2S_2O_8$ and $Na_2S_2O_3$, combinations of organic hydroperoxides and $Na_2S_2O_3$, and combinations of tertiary amines and dibenzoyl peroxide. Systems comprising acetone bisulfite and organic peroxide, such as tert-$C_4H_9$—OOH, $Na_2S_2O_5$ (sodium disulfite) and organic peroxide, such as tert.-$C_4H_9$—OOH or HO—$CH_2SO_2Na$, and organic peroxide, such as tert-$C_4H_9$—OOH are very particularly preferred. Systems such as, for example, ascorbic acid/$H_2O_2$, are also partitularly preferred.

In one embodiment of the present invention, temperatures in the range from 20 to 105° C., preferably from 50 to 85° C., more preferably at least 65° C. can be chosen as the polymerization temperature. The most favorable temperature chosen is dependent on the decomposition characteristics of the initiator used or of the initiators used.

The pressure conditions are generally not critical and, for example, pressures in the range from atmospheric pressure to 10 bar are suitable.

Further additives which are customary in emulsion polymerization, for example glycols, polyethylene glycols, protective colloids and buffers/pH regulators, can be added to the reaction mixture of the inventive polymerization process.

In one embodiment of the present invention, a duration in the range from 30 minutes to 12 hours, preferably from 2 to 5 hours, can be selected as the duration of the inventive polymerization process.

After the actual (co)polymerization, it is possible to effect deodorization, for example by adding initiator which is identical to or different from the initiator used in the actual inventive polymerization process.

In an embodiment of the present invention, the (co)polymerization takes place substantially completely. In such embodiments, the composition of (co)polymers made according to the inventive polymerization process does not differ measurably from the composition of the comonomers.

In an embodiment of the present invention, the process according to the invention is carried out by a one-stage process. In the context of the present invention, one-stage process is to be understood as meaning, for example, batch processes, and feed processes in which a proportion of the (co)monomers can be initially taken and proportions of the (co)monomers are added during the (co)polymerization (feed), the composition of the feed with respect to the (co)monomers remaining substantially constant during the (co)polymerization.

(Co)polymers according to the invention which are prepared by the process according to the invention are usually obtained in the form of aqueous dispersions, from which the respective (co)polymers can be isolated by methods known per se, such as, for example, evaporation of the water.

In an embodiment of the present invention, the mean diameter (number average) of solid particles in aqueous dispersions obtained according to the inventive polymerization process is in the range from 20 to 500 nm, preferably up to 200 nm, determined, for example, by quasi-elastic light scattering (QELS). Suitable methods of measurement are described, for example, in ISO13321 and start from aqueous dispersions according to the invention which are greatly diluted with water and have a solids content of from 0.005% by weight or less.

In an embodiment of the present invention, dispersions obtained according to the inventive polymerization process have a solids content in the range from 5 to 60% by weight, preferably from 20 to 50% by weight, particularly preferably from 25 to 45% by weight.

In a special embodiment of the present invention, dispersions obtained according to the inventive polymerization process have a pH value in the range from 2 to 9.

In a special embodiment of the present invention, dispersions obtained according to the inventive polymerization process have a pH value in the range from 2 to 6, preferably in the range from 3 to 4. They are preferably dispersions which contain non-neutralized (co)polymer.

In another special embodiment of the present invention, dispersions obtained according to the inventive polymerization process have a pH value in the range from 6 to 9, preferably in the range from 6.5 to 8. They are preferably dispersions which contain partly or completely neutralized (co)polymer.

In the inventive polymerization process a surfactant mixture will be used, said mixture comprising (A) an alkoxylation product of at least one alkanol (a), characterized in that alkanol (a) has 6 to 12, preferably 9 to 11 carbon atoms per molecule and the average number of alkylene oxide units per molecule in alkoxylation product (A) assumes a value in the range of from 35 to 55, preferably from 40 to 50, the alkylene oxide units are selected from $C_2$-$C_{10}$-alkylene oxide units and alkanol (a) has an average degree of branching of at least 1; and (B) an alkoxylation product of at least one alkanol (b), characterized in that alkanol (b) has 13 to 19 carbon atoms per molecule and the average number of alkylene oxide units per molecule in alkoxylation product (B) assumes a value in the range of from 35 to 55, preferably from 40 to 50, the alkylene oxide units are selected from $C_2$-$C_{10}$-alkylene oxide units, or (C) an alkoxylation product of at least one linear $C_{12}$-$C_{22}$-alkyl alcohol (c), characterized in that the average number of alkylene oxide units per molecule in alkoxylation product (C) assumes a value in the range of from 35 to 55, preferably from 40 to 50, the alkylene oxide units are selected from $C_2$-$C_{10}$-alkylene oxide units.

In embodiments in which two or more alkanols are used as alkanol and (a) said alkanol (a) having carbon atoms per molecule, it is preferred that said mixture is a $C_{10}$ Guerbet alcohol mixture. In such embodiments, the main components are a mixture of 2-propylheptanol and 5-methyl-2-propylhexanol. Preferably, alkanol (a) comprises at least 90%, preferably 95%, of such a mixture.

Said surfactant mixture can comprise at least on alkoxylation product (A) and at least one alkoxylation product (B) but no alkoxylation product (C). In another embodiment, said surfactant mixture can comprise at least on alkoxylation product (A) and at least one alkoxylation product (C) but no alkoxylation product (B). In another embodiment, said surfactant mixture can comprise at least on alkoxylation product (A) and at least one alkoxylation product (B) and at least one alkoxylation product (C).

Alkoxylation product (A) has an average number in the range of from 35 to 55, preferably from 40 to 50 alkylene oxide units per molecule ($M_n$), determined as OH number according to DIN 53240.

Alkoxylation product (B) has an average number in the range of from 35 to 55, preferably from 40 to 50 alkylene oxide units per molecule ($M_n$), determined as OH number according to DIN 53240.

Alkoxylation product (C) has an average number in the range of from 35 to 55, preferably from 40 to 50 alkylene oxide units per molecule ($M_n$), determined as OH number according to DIN 53240.

Alkylene oxide units in alkoxylation products (A), (B) and/or (C) are selected from $C_2$-$C_{10}$-alkylene oxide units, for example, —$CH_2CH_2$—O— (ethylene oxide or EO), —$CH_2CH(CH_3)$O— (propylene oxide or PO), —$CH_2CH(C_2H_5)$O— (1,2-butylene oxide or BuO), —$(CH_2)_3$—O—, —$(CH_2)_4$—O—, —$CH_2CH(n\text{-}C_3H_7)$—O—, —$CH_2CH(n\text{-}C_4H_9)$—O—, EO, PO, and BuO being preferred, more preference being given to ethylene oxide units and propylene oxide units and even more preference being given to ethylene oxide units. The alkylene oxide units of alkoxylation products may be identical or different within each alkoxylation product.

In one embodiment of the present invention, in alkoxylation product (A) and/or the alkoxylation product (B) and/or the alkoxylation product (C) the fraction of ethylene oxide units to the total number of alkylene oxide units for the particular alkoxylation product is at least 0.5.

In case in which alkoxylation product (A), alkoxylation product (B) or alkoxylation product (C) bears two or more different alkylene oxide units it is possible for the alkylene oxide units to be arranged in random distribution or block-wise.

The degree of branching of alkanols (a), (b), and (c) is defined as follows:

The degree of branching of an alcohol arises from the branches of the carbon backbone. For each alcohol molecule, it is defined as the number of carbon atoms which are bonded to three further carbon atoms, plus two times the number of carbon atoms which are bonded to four further carbon atoms. The average degree of branching of an alcohol mixture arises from the sum of all degrees of branching of the individual molecules divided by the number of individual molecules. The degree of branching is determined, for example, by means of NMR methods. This can be carried out through analysis of the carbon backbone with suitable coupling methods (COSY, DEPT, INADEQUATE), followed by a quantification via $^{13}C$ NMR with relaxation reagents. However, other NMR methods or GC-MS methods are also possible.

In one embodiment of the present invention, alkanol (a) has an average degree of branching of from 1.0 to 2.0. More preferably, alkanol (a) has an average degree of branching in the range from 1 to 1.5.

In one embodiment of the present invention, alkanol (b) has an average degree of branching of at least 2, preferably 2.2 to 4.

In one embodiment of the present invention the at least one alkanol (c) has 12 to 18 carbon atoms per molecule.

In a special embodiment of the present invention, alkoxylation product (A) is selected from alkoxylation products of a mixture of $C_{10}$-alkyl alcohols of the general formula (I)

$$C_5H_{11}CH(C_3H_7)CH_2OH \tag{I}$$

wherein
the $C_3H_7$-group is preferably n-propyl,
and which is a mixture comprising alkoxylation products (A1) and (A2), wherein
in alkoxylation products (A1), $C_5H_{11}$ has the meaning n-$C_5H_{11}$, and
in alkoxylation products (A2), $C_5H_{11}$ has the meaning $C_2H_5CH(CH_3)CH_2$ and/or $CH_3CH(CH_3)CH_2CH_2$.

Preferably, in the previous embodiments alkoxylation products, (A1) and (A2) are comprised in a ratio of 99:a total of 1, preferably to 7 to a total of 3.

Besides alkoxylation products of alkanols (a) it is likewise possible that alkoxylation products based on alcohols with at least one ethylenic C—C double bond are present, hereinafter also referred to as "olefinic alcohol", in which the OH-group is attached to an spa hybridized carbon. In said case such olefinic alcohols can have the same number of carbon atoms as the respective alkanol (a). However, it is preferred if olefinic alcohols are present their weigh fraction, based on the total weight of the surfactant mixture, below 10% by weight, preferably less than 5% by weight.

In one embodiment of the present invention, surfactant mixtures may contain alkanol (a), alkanol (b) and/or alkanol (c) as an impurity, said impurity also being referred to as residual alcohols. In a preferred embodiment, surfactant mixtures contain in the range of from 100 ppm to 1% by weight of residual alcohols. In other preferably embodiments, surfactants mixture do not contain detectable amounts of residual alcohols.

In one embodiment of the present invention, the average degree of alkoxylation of alkoxylation product (A) and alkoxylation product (B) in surfactant mixtures are identical. In another embodiment, the average degree of alkoxylation of alkoxylation product (A) and alkoxylation product (B) in surfactant mixtures are different.

In one embodiment of the present invention, the average degree of alkoxylation of alkoxylation product (A) and alkoxylation product (C) in surfactant mixtures are identical. In another embodiment, the average degree of alkoxylation of alkoxylation product (A) and alkoxylation product (C) in surfactant mixtures are different.

In one embodiment of the present invention, a surfactant mixture used in the inventive polymerization can comprise alkoxylation products of alkanol (a), alkanol (b) or alkanol (c) with an alkoxylation degree smaller than 35, hereinafter also referred to as low degree alkoxylation products. However, the amount (by weight) of low degree alkoxylation products is smaller than the amount (by weight) of the respective alkoxylation product (A), of the respective alkoxylation product (B) and of the respective alkoxylation product (C), if applicable.

In such embodiments in which a surfactant mixture used in the inventive polymerization contain low degree alkoxylation products it is preferred that the amount of such low degree alkoxylation products are present in amounts of 0.1 to 35% by weight, preferably 1 to a maximum of 25%, based on total of the respective alkoxylation product (A), of the respective alkoxylation product (B) and of the respective alkoxylation product (C), if applicable.

In one embodiment of the present invention, a surfactant mixture used in the inventive polymerization can comprise homopolymerization products of the alkylene oxide used or of at least one of the alkylene oxides used, respectively. For example, in embodiments alkoxylation product (A), alkoxylation product (B) and/or alkoxylation product (C) is/are selected from ethoxylates, polyethylene oxide can be present, for example at least 0.1% by weight, based on total amount of surfactant mixture. It is preferred that the total amount of homopolymerization products of alkoxide does not exceed 5% by weight, preferably not 3% by weight, based on total amount of surfactant mixture.

In one embodiment of the present invention, a surfactant mixture used in the inventive polymerization comprises
in the range of from 1 to 99% by weight of alkoxylation product (A), preferably 95 to 25% by weight, more preferably 90 to 50% by weight, and even more preferably 80 to 50% by weight, and most preferably 70 to 51% by weight of alkoxylation product (A), and
99 to 1% by weight of either alkoxylation product (B) or alkoxylation product (C), preferably 5 to 75% by weight, more preferably 10 to 50% by weight, even more preferably 20 to 50% by weight, and most preferably 30 to 49% by weight of either alkoxylation product (B) or alkoxylation product (C).

In one embodiment of the present invention, surfactant mixture used in the inventive polymerization comprises
in the range of from 1 to 99% by weight of alkoxylation product (A), preferably 95 to 25% by weight, more preferably 90 to 50% by weight, and even more preferably 80 to 50% by weight, and most preferably 70 to 51% by weight of alkoxylation product (A), and
99 to 1% by weight of alkoxylation product (B) and alkoxylation product (C) in total, preferably 5 to 75% by weight, more preferably 10 to 50% by weight, even more preferably 20 to 50% by weight, and most preferably 30 to 49% by weight of alkoxylation product (B) and alkoxylation product (C) in total.

In embodiments wherein both alkoxylation product (B) and alkoxylation product (C) are employed, the weight ratio of alkoxylation product (B) and alkoxylation product (C) can be in the range of from 1:100 to 100:1, preferably of from 3:1 to 1:3.

In one embodiment of the present invention, the surfactant mixture described above will be diluted with water before being added to the emulsion polymerization.

In one embodiment of the present invention, the (co)monomers will be added to a vessel containing water and at least one surfactant, preferable the surfactant mixture described above, optionally in combination with one or more further surfactants. Mixing, preferably stirring will be performed. By stirring, the (co)monomers will be distributed as droplets and the surfactant mixture as micelles. In one embodiment, the average droplet diameter is in the range of from 1 to 10 µm. In a second embodiment, the average droplet diameter is in the range of from 0.1 to 0.2 µm. In a further embodiment, the average droplet diameter is in the range of from 0.0005 to 0.1 µm. Then, initiator will be added.

By performing the inventive polymerization process, (co)polymers with excellent morphology can be obtained. Due to the non-gelling of the inventive surfactant mixture upon dilution with water, the (c) inventive polymerization process can be performed without having to remove the gel phase. The inventive polymerization process can thus be performed with higher performance. It has further been found that the properties of the polymer dispersions obtained according to the inventive polymerization process are excellent, such as small particle size, excellent film properties, and low water sensitivity.

A further aspect of the present invention is the use of a surfactant mixture comprising
(A) an alkoxylation product of at least one alkanol (a), characterized in that alkanol (a) has 6 to 12 carbon atoms per molecule and the average number of alkylene oxide units per molecule in alkoxylation product (A) assumes a value in the range of from 35 to 55, the alkylene oxide units are selected from $C_2$-$C_{10}$-alkylene oxide units and alkanol (a) has an average degree of branching of at least 1; and
(B) an alkoxylation product of at least one alkanol (b), characterized in that alkanol (b) has 13 to 19 carbon atoms per molecule and the average number of alkylene oxide units per molecule in alkoxylation product (B) assumes a value in the range of from 35 to 55, the alkylene oxide units are selected from $C_2$-$C_{10}$-alkylene oxide units, or
(C) an alkoxylation product of at least one linear $C_{12}$-$C_{22}$-alkyl alcohol (c), characterized in that the average number of alkylene oxide units per molecule in alkoxylation product (C) assumes a value in the range of from 35 to 55, the alkylene oxide units are selected from $C_2$-$C_{10}$-alkylene oxide units
as surfactant in an emulsion polymerization. Methods of such use have been described above.

A further aspect of the present invention is a surfactant mixture comprising
(A) an alkoxylation product of at least one alkanol (a), characterized in that alkanol (a) has 6 to 12 carbon, preferably 9 to 11 atoms per molecule and the average number of alkylene oxide units per molecule in alkoxylation product (A) assumes a value in the range of from 35 to 55, the alkylene oxide units are selected from $C_2$-$C_{10}$-alkylene oxide units and alkanol (a) has an average degree of branching of at least 1; and
(B) an alkoxylation product of at least one alkanol (b), characterized in that alkanol (b) has 13 to 19 carbon atoms per molecule and the average number of alkylene oxide units per molecule in alkoxylation product (B) assumes a value in the range of from 35 to 55, the alkylene oxide units are selected from $C_2$-$C_{10}$-alkylene oxide units, or (C) an alkoxylation product of at least one linear $C_{12}$-$C_{22}$-alkyl alcohol (c), preferably $C_{12}$-$C_{18}$-alkyl alconol, characterized in that the average number of alkylene oxide units per molecule in alkoxylation product (C) assumes a value in the range of from 35 to 55, the alkylene oxide units are selected from $C_2$-$C_{10}$-alkylene oxide units.

With respect to inventive surfactant mixtures, the integers and terms are as defined above.

Alkoxylation product (A) has an average number in the range of from 35 to 55, preferably from 40 to 50 alkylene oxide units per molecule ($M_n$), determined as OH number according to DIN 53240.

Alkoxylation product (B) has an average number in the range of from 35 to 55, preferably from 40 to 50 alkylene oxide units per molecule ($M_n$), determined as OH number according to DIN 53240.

Alkoxylation product (C) has an average number in the range of from 35 to 55, preferably from 40 to 50 alkylene oxide units per molecule ($M_n$), determined as OH number according to DIN 53240.

The alkylene oxide units of alkoxylation products may be identical or different within each alkoxylation product in inventive surfactants mixture. Preferably, they are identical.

In one embodiment of the present invention, in alkoxylation product (A) and/or the alkoxylation product (B) and/or the alkoxylation product (C) the fraction of ethylene oxide units to the total number of alkylene oxide units for the particular alkoxylation product is at least 0.5.

In case in which alkoxylation product (A), alkoxylation product (B) or alkoxylation product (C) bears two or more different alkylene oxide units it is possible for the alkylene oxide units to be arranged in random distribution or blockwise.

In one embodiment of the present invention, alkanol (b) has an average degree of branching of at least 2, preferably 2.2 to 4.0.

In one embodiment of the present invention the alkylene oxide units in (A) and (B) or (C) are selected independently from the group consisting of ethylene oxide units and propylene oxide units.

In one embodiment of the present invention, for alkoxylation product (A) and/or the alkoxylation product (B) or (C), respectively, the fraction of ethylene oxide units to the total number of alkylene oxide units for the particular alkoxylation product is at least 0.5.

In one embodiment of the present invention, inventive surfactant mixtures may contain the respective residual alcohols. In a preferred embodiment, inventive surfactant mixtures contain only very little, for example in the range of from 100 ppm to 1% by weight of residual alcohols.

In other preferably embodiments, surfactants mixture do not contain detectable amounts of residual alcohols.

In one embodiment of the present invention, the average degree of alkoxylation of alkoxylation product (A) and alkoxylation product (B) in surfactant mixtures are identical. In another embodiment, the average degree of alkoxylation of alkoxylation product (A) and alkoxylation product (B) in surfactant mixtures are different.

In one embodiment of the present invention, the average degree of alkoxylation of alkoxylation product (A) and alkoxylation product (C) in surfactant mixtures are identical. In another embodiment, the average degree of alkoxylation of alkoxylation product (A) and alkoxylation product (C) in surfactant mixtures are different.

In one embodiment of the present invention, inventive surfactant mixtures can comprise alkoxylation products of alkanol (a), alkanol (b) or alkanol (c) with an alkoxylation degree smaller than 35. However, the amount (by weight) of alkoxylation products of alkanol (a), alkanol (b) or alkanol (c) with an alkoxylation degree smaller than 35 is smaller than the amount (by weight) of the respective alkoxylation product (A), of the respective alkoxylation product (B) and of the respective alkoxylation product (C), if applicable.

In one embodiment of the present invention, inventive surfactant mixtures comprise in the range of from 1 to 99% by weight of alkoxylation product (A), preferably 95 to 25% by weight, more preferably 90 to 50% by weight, and even more preferably 80 to 50% by weight, and most preferably 70 to 51% by weight of alkoxylation product (A), and 99 to 1% by weight of either alkoxylation product (B) or alkoxylation product (C), preferably 5 to 75% by weight, more preferably 10 to 50% by weight, even more preferably 20 to 50% by weight, and most preferably 30 to 49% by weight of either alkoxylation product (B) or alkoxylation product (C).

In one embodiment of the present invention, inventive surfactant mixtures comprise in the range of from 1 to 99% by weight of alkoxylation product (A), preferably 95 to 25% by weight, more preferably 90 to 50% by weight, and even more preferably 80 to 50% by weight, and most preferably 70 to 51% by weight of alkoxylation product (A), and 99 to 1% by weight of alkoxylation product (B) and alkoxylation product (C) in total, preferably 5 to 75% by weight, more preferably 10 to 50% by weight, even more preferably 20 to 50% by weight, and most preferably 30 to 49% by weight of alkoxylation product (B) and alkoxylation product (C) in total.

In embodiments wherein both alkoxylation product (B) and alkoxylation product (C) are employed, the weight ratio of alkoxylation product (B) and alkoxylation product (C) can be in the range of from 1:100 to 100:1, preferably of from 3:1 to 1:3.

In one embodiment of the present invention, inventive surfactant mixtures can comprise low degree alkoxylation products. However, the amount (by weight) of low degree alkoxylation products is smaller than the amount (by weight) of the respective alkoxylation product (A), of the respective alkoxylation product (B) and of the respective alkoxylation product (C), if applicable.

In such embodiments in which inventive surfactant mixtures used contain low degree alkoxylation products it is preferred that the amount of such low degree alkoxylation products are present in amounts of 0.1 to 35% by weight, preferably 1 to a maximum of 25%, based on total of the respective alkoxylation product (A), of the respective alkoxylation product (B) and of the respective alkoxylation product (C), if applicable.

Inventive surfactants mixtures are particularly useful as surfactants in emulsion polymerization processes but they can also be used in formulations for hard surface cleaning, as component in laundry detergents, in cosmetic, pharmaceutical and crop protection formulations, in paints, coating compositions, adhesives, leather-degreasing compositions, for the textile industry such as—but not limited to—fibre processing, in metal processing, food industry, water treatment, paper industry, fermentation or in mineral processing.

A further aspect of the present invention is a method making for inventive surfactant mixtures, in brief inventive method. The inventive method comprises the step of mixing at least one alkanol (a) with at least one alkanol (b) or at least one alkanol (c) and alkoxylating the mixture so obtained, optionally in the presence of a catalyst.

In one embodiment of the present invention, the inventive method is carried out in the presence of KOH, preferably in an amount of from 0.1 to 1% by weight, based on the total amount of the total amounts of alkanols(a), (b) or (c) to be alkoxylated, or—in embodiments in which said alkanols are to be alkoxylated separately—based on the respective alkanol (a), (b) or (c) to be alkoxylated.

The synthesis of alkanols (a), alkanols (b) and alkanols (c) is known in the art.

An acidic catalysis of the addition reaction is also possible. Besides Bronsted acids, Lewis acids are also suitable, such as, for example, $AlCl_3$ or $BF_3$ etherate, $BF_3$, $BF_3 \cdot H_3PO_4$, $SbCl_5 \cdot 2H_2O$ and hydrotalcite.

In one embodiment of the present invention, the inventive method is carried out in the presence of at least one double-metal cyanide (DMC) compound as catalyst.

Double-metal cyanide compounds usually comprise at least two different metals, at least one of them being selected from transition metals and the other one being selected from transition metals and alkali earth metals, and cyanide counterions. Particularly suitable catalysts for the alkoxylation are double-metal cyanide compounds which contain zinc, cobalt or iron or two thereof. Berlin blue, for example, is particularly suitable.

Preference is given to using crystalline DMC compounds. In a preferred embodiment, a crystalline DMC compound of the Zn—Co type which comprises zinc acetate as further metal salt component is used as catalyst. Such compounds crystallize in monoclinic structure and have a platelet-like habit. Such compounds are described, for example, in WO 00/74845 and in WO 01/64772.

Examples for double-metal cyanide compounds suitable as catalyst are described in WO 2003/091192.

Double-metal cyanide compounds can be used as powder, paste or suspension or be moulded to give a moulding, be introduced into mouldings, foams or the like or be applied to mouldings, foams or the like.

The catalyst concentration used for the inventive method, based on the final amount structure, is typically less than 2000 ppm (i.e. mg of catalyst per kg of product), preferably less than 1000 ppm, in particular less than 500 ppm, particularly preferably less than 100 ppm, for example less than 50 ppm or 35 ppm, particularly preferably less than 25 ppm; ppm referring to massppm (parts per million) of the total amount of alkanols(a), (b) or (c) to be alkoxylated, or—in embodiments in which said alkanols are to be alkoxylated separately—based on the respective alkanol (a), (b) or (c) to be alkoxylated.

In one embodiment of the present invention, the inventive method is carried out at temperatures in the range of from 90 to 240° C., preferably from 120 to 180° C., in a closed vessel.

In the context of the present invention, ethylene oxide or alkylene oxide of general formula (V) or a mixture of different alkylene oxides of general formula (V) or a mixture of ethylene oxide and alkylene oxide of general formula (V) can also generally be referred to as "alkylene oxide(s)".

In one embodiment of the present invention, alkylene oxide(s) is/are introduced into a mixture of alkanols (a), (b) or (c) to be alkoxylated, or—in embodiments in which said alkanols are to be alkoxylated separately—into single respective alkanol (a), (b) or (c) to be alkoxylated—and catalyst, for example alkali or Lewis acid or the DMC catalyst—under the vapour pressure of the alkylene oxide or the respective mixture of alkylene oxides prevailing at the selected reaction temperature. Alkylene oxide(s) can be introduced in pure form or, as an alternative, be diluted up to about 30 to 60% by volume with an inert gas such as a rare gas or nitrogen. This affords additional safety against explosion-like polyaddition of the alkylene oxide.

In case several alkylene oxides are being introduced polyether chains will be formed in which the different alkylene oxide units are distributed virtually randomly in compounds of general formulae (I) and (II). Variations in the distribution of the units along the polyether chain can arise due to differing reaction rates of the alkylene oxides. Variations in the distribution of the units along the polyether chain can be achieved arbitrarily by continuously introducing an alkylene oxide mixture of program-controlled composition as well. In case different alkylene oxides are reacted subsequently, then polyether chains with a block-type distribution of the alkylene oxide units are obtained.

Preferred inventive surfactant mixtures can be obtained by reacting alkanols (a), (b) or (c), or—in embodiments in which said alkanols are going to be alkoxylated separately—the respective alkanol (a), (b) or (c) firstly with propylene oxide and then with ethylene oxide under conditions indicated above.

Further preferred inventive mixtures can be obtained by reacting alkanols (a), (b) or (c), or—in embodiments in which said alkanols are going to be alkoxylated separately—the respective alkanol (a), (b) or (c) solely with ethylene oxide.

In one embodiment of the present invention, the inventive method is carried out without a diluent.

In one embodiment of the present invention, the inventive method can be carried out using a solvent. Suitable solvents are, for example, N,N-dimethyl formamide, toluene, o-xylene, mxylene, and p-xylene.

In many embodiments, the conversion with alkylene oxide(s) is incomplete with respect to alkylene oxide(s). In one embodiment of the present invention, alkylene oxide(s) is/are reacted in a molar excess of at least 1.5·n, referring to the total of alkanols (a), (b) or (c), or—in embodiments in which said alkanols are going to be alkoxylated separately—the respective alkanol (a), (b) or (c).

In one embodiment of the present invention, the inventive method is carried out in the presence of at least one double-metal cyanide selected from compounds according to general formula (II)

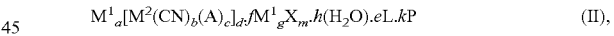

$$M^1_a[M^2(CN)_b(A)_c]_d \cdot fM^1_g X_m \cdot h(H_2O) \cdot eL \cdot kP \qquad (II),$$

in which the integers are defined as follows:

$M^1$ is at least one metal ion chosen from the group consisting of $Zn^{2+}$, $Fe^{2+}$, $Fe^{3+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $Hg^{2+}$, $Pd^{2+}$, $Pt^{2+}$, $V^{2+}$, $Mg^{2+}$, $Ca^{2+}$, $Ba^{2+}$, $Cu^{2+}$, $La^{3+}$, $Ce^{3+}$, $Ce^{4+}$, $Eu^{3+}$, $Ti^{3+}$, $Ti^{4+}$, $Ag^+$, $Rh^{2+}$, $Rh^{3+}$, $Ru^{2+}$, $Ru^{3+}$, $M^2$ is at least one metal ion chosen from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$, $Ir^{3+}$, and in a way that $M^1$ and $M^2$ are not identical, A and X, independently of one another, are anions selected from the group consisting of halide, hydroxide, sulfate, carbonate, cyanide, thiocyanate, isocyanate, cyanate, carboxylate, oxalate, nitrate, nitrosyl, hydrogensulfate, phosphate, dihydrogenphosphate, hydrogenphosphate or hydrogencarbonate, L is a ligand chosen from the group consisting of alcohols, aldehydes, ketones, ethers, polyethers, esters, polyesters, polycarbonate, ureas, amides, primary, secondary and tertiary amines, ligands with pyridine nitrogen, nitriles, sulfides, phosphides, phosphites, phosphanes, phosphonates and phosphates, k is a integer greater than or equal to zero, and k can be whole number or a fraction.

P is an organic additive, a, b, c, d, g and n are chosen such that the electroneutrality of the compound (II) is ensured, where c may be 0, e is the number of ligand molecules a fraction or integer greater than zero, or zero, f and h, independently of one another, are fractions or integers greater than zero, or zero.

In one embodiment, organic additive P is selected from polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylamide-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethylcellulose, polyacetates, ionic surface-active and interface-active compounds, bile acid or salts thereof, esters or amides, carboxylic esters of polyhydric alcohols and glycosides.

Double-metal cyanide compounds may be crystalline or amorphous. When k is zero, crystalline double-metal cyanide compounds are preferred. When k is greater than zero, crystalline, partially crystalline and substantially amorphous catalysts as well are preferred.

There are various preferred embodiments of the modified catalysts. A preferred embodiment covers catalysts of the formula (II) in which k is greater than zero. The preferred catalyst then comprises at least one double-metal cyanide compound, at least one organic ligand and at least one organic additive P.

In another preferred embodiment of the inventive method, k is zero, optionally e is also zero and X is exclusively a carboxylate, preferably formate, acetate and propionate. In this embodiment, preference is given to crystalline double-metal cyanide catalysts. Other preferred embodiments are double-metal cyanide catalysts as described in WO 00/74845, which are crystalline and platelet-like.

In another preferred embodiment of the catalysts, f, e and k do not equal zero. Such embodiments refer to double-metal cyanide catalysts which contain L, preferably in amounts of from 0.5 to 30% by weight based on total amount of catalyst, and an organic additive P (generally in amounts of from 5 to 80% by weight), as described in WO 98/03612. Such catalysts can either be prepared with vigorous stirring (24,000 rpm using Turrax) or with stirring, as described in U.S. Pat. No. 5,158,922.

In one embodiment of the inventive method double-metal cyanide compounds can be are prepared by combining a metal salt solution with a cyanometallate solution, which may optionally contain both a ligand L and also an organic additive P. Subsequently, the organic ligand and optionally the organic additive are added. In a preferred embodiment of the catalyst preparation, an inactive double-metal cyanide compound is firstly prepared, and this is then converted into its active phase by recrystallization, as described in WO 01/64772.

DMC compounds suitable as catalysts may, in principle, be prepared by all ways known to the person skilled in the art. For example, the DMC compounds can be prepared by direct precipitation, incipient wetness method, by preparing a precursor phase and subsequent recrystallization.

Alkoxylates so obtained can be used without further purification for the inventive polymerization process. In other embodiments, the reaction mixture can be filtered, e.g., over cellulose filter material, or degassed under reduced pressure. In such cases, reduced pressure may mean, e.g., 10 to 50 mbar at a temperature in the range of from 30 to 100° C.

By performing the inventive method, inventive surfactant mixtures can be obtained in excellent yields.

The present invention is further illustrated by examples.

General Remarks:

Percentages are % by weight unless specifically specified otherwise

The following catalyst was used: KOH rpm: rounds per minute.

The particle size was measured using a Beckmann-Coulter laser diffraction particle size analyzer LS 13320.

The solid content was determined using a Mettler Toledo Halogen Moisture Analyzer by drying an aliquot of the dispersion at 200° C. until a constant weight was reached.

Film properties were determined by casting a film onto a glass substrate using a 70 micrometer applicator frame and drying it over 16 hours at room temperature. The quality was evaluated visually using a 1-6 scale with 1 being the best and 6 being the worst for specks and describing the appearance verbally (e.g. cloudy, clear, cracks, etc.).

Electrolyte Stability was determined by adding two drops of the emulsion to approx. 5 ml of calcium chloride solution at different concentrations (1.0 mol/l, 0.1 mol/l, 0.01 mol/l and 0.001 mol/l). If the emulsion coagulates at a certain concentration of calcium chloride it is considered unstable, otherwise stable at said concentration.

To determine the water uptake approx. 5 g of the polymer dispersion were placed into an aluminum dish (e.g. VWR aluminum dish w/tab 57 mm) and dried for 24 hours at 70° C. Then the aluminum dish with the dried film was filled with water and left standing for 24 hours. Then the water was decanted and visible drops of water were removed. The water uptake was determined by subtracting the weight of the dish with polymer film before exposing it to water from the weight of the dish with polymer film after exposition it to water.

I. SYNTHESIS OF INVENTIVE SURFACTANT MIXTURES AND OF COMPARATIVE SURFACTANT MIXTURES

I.1: Comparative Example 1

A mixture of the following alcohols was ethoxylated:

(a.1): 2-n-propylheptanol (n-$C_5H_{11}$—CH(n-$C_3H_7$)—$CH_2$—OH) degree of branching: 1

(b.1): of a mixture of branched $C_{13}$-alkanols, obtained according to WO 01/36356, example 2 Ratio of (a.1) to (b.1) 44:56% by weight A 2.5-liter autoclave with propeller stirrer was charged with 202.9 g (1.01 mol) of (b.1), 159.9 g of (a.1) (1.01 mol) and 4.17 g of an aqueous solution of KOH (45%). The resultant mixture was heated under stirring (100 rpm) to 80° C., the pressure was reduced to <20 mbar and water was distilled off for 30 min. A pressure of 2.0 bar was set with dry nitrogen. Then, the pressure was reduced to 0.25 bar. The mixture was heated to 150° C., and the pressure of dry nitrogen was adjusted to 0.5 bar. Ethylene oxide (889.8 g, 20.2 mol) was added during 4.6 hours while stirring at 400 rpm. The pressure rose to 2.3 bar during that period.

The reaction mixture was stirred for another 0.6 hours at 150° C. Then, the mixture was cooled down to 100° C. and the pressure reduced to 50 mbar. The mixture was stirred at 50 mbar for 30 min. Then, dry nitrogen was added and the pressure thus adjusted to ambient pressure. The reaction mixture was cooled to room temperature. It was then neutralized with 2.01 g glacial acetic acid (100%).

Comparative mixture C-(A.1)/(B.1) was obtained: hydroxyl number of 91.2 (DIN 53240), pH value 6.5 (5%, EN 1262).

I.2: Comparative Example 2

A 2.5-liter autoclave with propeller stirrer was charged with 121.3 g (0.6 mol) of (b.1), 95.7 g of (a.1) (0.6 mol) and 4.27 g of an aqueous solution of KOH (45%). The resultant mixture was heated under stirring (100 rpm) to 80° C., the pressure was reduced to <20 mbar and water was distilled off for 30 min. A pressure of 2.0 bar was set with dry nitrogen. Then, the pressure was reduced to 0.25 bar. The mixture was heated to 150° C., and the pressure of dry nitrogen was adjusted to 0.5 bar. Ethylene oxide (1064.8 g, 24.2 mol) was added during 5.5 hours while stirring at 400 rpm. The pressure rose to 2.3 bar during that period.

The reaction mixture was stirred for another 0.6 hours at 150° C. Then, the mixture was cooled down to 100° C. and the pressure reduced to 50 mbar. The mixture was stirred at 50 mbar for 30 min. Then, dry nitrogen was added and the pressure thus adjusted to ambient pressure. The reaction mixture was cooled to room temperature. It was then neutralized with 2.01 g glacial acetic acid (100%).

Comparative mixture C-(A.2)/(B.2) was obtained: hydroxyl number of 54.9 (DIN 53240), pH value 6.2 (5%, EN 1262).

I.3: Comparative Example 3

A 2.5-liter autoclave with propeller stirrer was charged with 81.3 g (0.41 mol) of (b.1), 64.5 g of (a.1) (0.41 mol) and 4.12 g of an aqueous solution of KOH (45%). The resultant mixture was heated under stirring (100 rpm) to 80° C., the pressure was reduced to <20 mbar and water was distilled off for 30 min. A pressure of 2.0 bar was set with dry nitrogen. Then, the pressure was reduced to 0.25 bar. The mixture was heated to 150° C., and the pressure of dry nitrogen was adjusted to 0.5 bar. Ethylene oxide (1073.9 g, 24.4 mol) was added during 5.6 hours while stirring at 400 rpm. The pressure rose to 2.6 bar during that period.

The reaction mixture was stirred for another 0.6 hours at 150° C. Then, the mixture was cooled down to 100° C. and the pressure reduced to 50 mbar. The mixture was stirred at 50 mbar for 30 min. Then, dry nitrogen was added and the pressure thus adjusted to ambient pressure. The reaction mixture was cooled to room temperature. It was then neutralized with 2.01 g glacial acetic acid (100%).

Comparative mixture C-(A.3)/(B.3) was obtained: hydroxyl number of 38.8 (DIN 53240), pH value 7.6 (5%, EN 1262).

I.4: Inventive Example 4

A 2.5-liter autoclave with propeller stirrer was charged with 62.0 g (0.31 mol) of (b.1), 49.0 g of (a.1) (0.31 mol) and 4.01 g of an aqueous solution of KOH (45%). The resultant mixture was heated under stirring (100 rpm) to 80° C., the pressure was reduced to <20 mbar and water was distilled off for 30 min. A pressure of 2.0 bar was set with dry nitrogen. Then, the pressure was reduced to 0.25 bar. The mixture was heated to 150° C., and the pressure of dry nitrogen was adjusted to 0.5 bar. Ethylene oxide (1092.4 g, 24.8 mol) was added during 6.5 hours while stirring at 400 rpm. The pressure rose to 4.3 bar during that period.

The reaction mixture was stirred for another 42 minutes at 150° C. Then, the mixture was cooled down to 100° C. and the pressure reduced to 50 mbar. The mixture was stirred at 50 mbar for 30 min. Then, dry nitrogen was added and the pressure thus adjusted to ambient pressure. The reaction mixture was cooled to room temperature. It was then neutralized with 2.0 g glacial acetic acid (100%).

Inventive mixture (A.4)/(B.4) was obtained: hydroxyl number of 31.1 (DIN 53240), pH value 6.1 (5%, EN 1262).

Physical Properties of the inventive surfactant mixtures and comparative surfactant mixtures: The dynamic viscosity (mPa·s) of the mixtures of surfactants was determined after dilution with deionized water according to table 1 and measured with Brookfield viscometer at 23° C. according to EN 12092

TABLE 1

Viscosity (mPa · s) of the inventive surfactant mixture and comparative surfactant mixtures diluted with deionized water and measured with Brookfield viscometer at 23° C. according to EN 12092:

|  | 30% | 40% | 50% | 60% | 70% |
|---|---|---|---|---|---|
| C-(A.1)/C-(B.1) | ca. 46 | 295 | 42640 | 276 | 193 |
| C-(A.2)/C-(B.2) | 137 | 211 | 655 | 485 | 495 |
| (C-(A.3)/C-(B.3) | 81 | 259 | 645 | 925 | 669 |
| (A.4)/(B.4) | 185 | 363 | 803 | 1150 | 1412 |

TABLE 2

Pour point (° C.) of the of the inventive surfactant mixture and comparative surfactant mixtures diluted with deionized water according to table 2 and measured according to DIN 51583

|  | 60% | 70% |
|---|---|---|
| C-(A.1)/C-(B.1) | −12 | −42 |
| C-(A.2)/C-(B.2) | −30 | 0 |
| (C-(A.3)/C-(B.3) | −27 | −10 |
| (A.4)/(B.4) | −26 | −6 |

II. Inventive Emulsion Polymerization Process

II.1 Emulsion polymerization of Styrene/Acrylate

Equipment: 1.7 liter reaction vessel equipped with anchor stirrer which was submersed into a water bath for temperature control, and feeding vessels (stirred for the monomer premix, non-stirred for the initiator feed) which were attached to weight modules for precise control of feeding.

Comonomer system: styrene (49 wt. %), n-butyl acrylate (49 wt. %), methacrylic acid (2 wt. %)

Procedure:

Preparation of Comonomer-Premix:

Styrene (308.7 g), n-butyl acrylate (308.7 g), methacrylic acid (12.6 g) demineralized water (210 g), sodium dodecyl sulfate (1.9 g) and the surfactant mixture (A.4)/(B.4) (12.0 g) were mixed to yield the comonomer premix which was filled into the stirred feed vessel.

Preparation of Initiator Solution:

Sodium persulfate $Na_2S_2O_8$ (1.0 g) was dissolved in demineralized water (84 g) to give the initiator solution which is filled into a non-stirred feed vessel.

The reaction vessel was charged with a solution of sodium persulfate (0.44 g) in demineralized water (461.3 g). The solution was heated under stirring (100 rpm) to 60° C. Then, 19.0 g of the comonomer premix were added and temperature was raised to 85° C. At a temperature of 85°, feeding of comonomer premix and the initiator solution was commenced simultaneously. The comonomer premix was fed over a period of 2.0 hours, the initiator solution over a period of 2.5 hours. After the initiator solution had been fed completely the reaction was stirred at 85° C. for another hour and then the dispersion so obtained was cooled to room temperature. The pH value was adjusted to 9 with aqueous 25% by weight ammonia solution.

Work-Up and Analysis:

The above dispersion was filtered over a 240 µm filter. The filter residue was rinsed with water, dried and weighed to give the coagulum content.

To perform the comparative examples the non-ionic surfactant mixture (A.4)/(B.4) was replaced 1:1 by weight by the comparative mixture of non-ionic surfactant mixture C-(A.1)/C-(B.1), C(A.2)/C-(B.2) or (C-(A.3)/C-(B.3).

Preparation of Initiator Solution:

Sodium Persulfate (1.01 g) was dissolved in demineralized water (84 g) to give the initiator solution which is filled in the non-stirred feed vessel.

The reaction vessel was charged with a solution of sodium persulfate (0.44 g) in demineralized water (461.3 g). The solution was heated under stirring (100 rpm) to 60° C. Then, 19.0 g of the comonomer premix were added and the temperature was raised to 80° C. At a temperature of 85°, feeding of comonomer premix and the initiator solution was commenced simultaneously. The comonomer premix was fed over a period of 2.0 hours, the initiator solution over a period of 2.5 hours. After the initiator solution had been fed completely the reaction was stirred at 80° C. for another hour and then the dispersion so obtained was cooled to room temperature. The pH value was adjusted to 9 with aqueous 25% by weight ammonia solution.

TABLE 3

Polymerization Results

| Surfactant mixture | Conversion [%] | Coagulum [%] | Particle diameter [nm] | Water uptake [%] | Film properties | Electrolyte stability |
|---|---|---|---|---|---|---|
| C-(A.1)/C-(B.1) | 70.4 | 0.01 | 456 | 1.9 | film broken | ++ |
| C-(A.2)/C-(B.2) | 72.9 | 0.01 | 424 | 2.0 | film broken | ++ |
| (C-(A.3)/C-(B.3) | 96.9 | 0.04 | 259 | 2.0 | 3 | ++ |
| (A.4)/(B.4) | 100 | 0.02 | 118 | 1.2 | 2 | ++ |

Conversion: total conversion of comonomers 11.1 Emulsion Polymerization of a Mixture of Acrylic/Methacrylic Comonomers An emulsion polymerization is conducted according to procedures known as state of the art.

Equipment: 1.7 liter reaction vessel equipped with anchor stirrer which is submersed into a water bath for temperature control. Feeding vessels (stirred for the monomer premix, non-stirred for the initiator feed) which were fixed to weight modules for exact control of dosing. The dosing and temperature profile is computer controlled and the computer can record dosage and temperature profiles.

Work-Up and Analysis:

The above dispersion was filtered over a 240 µm filter. The filter residue was rinsed with water, dried and weighed to give the coagulum content.

TABLE 4

Polymerisation Results

| Surfactant mixture | Conversion [%] | Coagulum [%] | Particle diameter [nm] | Water uptake [%] | Film properties | Electrolyte stability |
|---|---|---|---|---|---|---|
| C-(A.1)/C-(B.1) | 100 | 0.01 | 519 | 2.8 | 3 | ++ |
| C-(A.2)/C-(B.2) | 100 | 0.01 | 469 | 2.1 | 3 | ++ |
| (C-(A.3)/C-(B.3) | 100 | 0.01 | 190 | 3.2 | 3 | ++ |
| (A.4)/(B.4) | 100 | 0.01 | 196 | 2.9 | 2 | ++ |

Conversion: total conversion of comonomers

Monomer system: methyl methacrylate (49.9 wt. %), n-butyl acrylate (48.8 wt. %), methacrylic acid (1.3 wt. %)

Procedure:

Preparation of Comonomer Premix:

A stirred feed vessel was charged with a mixture of methyl methacrylate (314.8 g), n-butyl acrylate (307.4 g), methacrylic acid (8.2 g), demineralized water (210 g), sodium dodecyl sulfate (1.9 g) and surfactant mixture (A.4)/(B.4) (12 g) were mixed to yield the monomer premix which was filled into the feed vessel.

To perform the comparative examples the non-ionic surfactant mixture (A.4)/(B.4) was replaced 1:1 by weight by the comparative mixture of non-ionic surfactant mixture C-(A.1)/C-(B.1), C(A.2)/C-(B.2) or (C-(A.3)/C-(B.3).

The invention claimed is:

1. A process, comprising:
   polymerizing at least one monomer in the presence of a surfactant mixture under emulsion polymerization conditions, wherein the at least one monomer is selected from the group consisting of a vinyl aromatic compound, an ethylenically unsaturated carboxylic acid with 3 to 10 carbon atoms, a $C_1$-$C_{10}$-alkyl ester of an ethylenically unsaturated carboxylic acid with 3 to 10 carbon atoms, an ethylenically unsaturated carboxylic acid with 3 to 10 carbon atoms, 1,3-butadiene, isoprene, and an α-olefin bearing in the range of from 10 to 250 carbon atoms per molecule, in pure form or as mixture with at least one isomer, and the surfactant mixture comprises (A) an alkoxylation product comprising an alkanol (a), wherein the alkanol (a) has 6 to 12 carbon atoms per molecule and an average number of alkylene oxide units per molecule in the alkoxylation product (A) is in the range of from 35 to 55, the alkylene oxide units are $C_2$-$C_{10}$-alkylene oxide units and the alkanol (a) has an average degree of branching of at least 1; and at least one of (B) an alkoxylation product comprising an alkanol (b), wherein the alkanol (b) has 13 to 19 carbon atoms per molecule and an average number of alkylene oxide units per molecule in the alkoxylation product (B) is in the range of from 35 to 55, the alkylene oxide units are $C_2$-$C_{10}$-alkylene oxide units, or (C) an alkoxylation product comprising a linear $C_{12}$-$C_{22}$-alkyl alcohol (c), wherein an average number of alkylene oxide units per molecule in the alkoxylation product (C) is in the range of from 35 to 55, the alkylene oxide units are $C_2$-$C_{10}$-alkylene oxide units.

2. The process according to claim 1, wherein the alkanol (b) has an average degree of branching of at least 2.

3. The process according to claim 1, wherein the alkylene oxide units are selected independently from the group consisting of ethylene oxide units and propylene oxide units.

4. The process according to claim 1, wherein the polymerizing is started by an initiator selected from the group consisting of a peroxide and a system comprising a peroxide.

5. The process according to claim 3, wherein a fraction of the ethylene oxide units to the total number of the alkylene oxide units for the alkoxylation product is at least 0.5.

6. The process according to claim 1, wherein the alkanol (a) has 9 to 11 carbon atoms.

7. The process according to claim 1, wherein the linear $C_{12}$-$C_{22}$-alkyl alcohol (c) has 12 to 18 carbon atoms per molecule.

8. The process according to claim 1, wherein the alkanol (b) has an average degree of branching of from 2.2 to 4.

9. The process according to claim 1, wherein the polymerizing is performed at a temperature in the range of from 50 to 85° C.

10. The process according to claim 1, wherein the surfactant mixture comprises 50 to 90% by weight of (A) and at least one of 10 to 50% by weight of (B) or 10 to 50% by weight of (C).

11. The process according to claim 1, wherein the surfactant mixture comprises 50 to 80% by weight of (A) and at least one of 20 to 50% by weight of (B) or 20 to 50% by weight of (C).

12. A surfactant mixture, comprising (A) 50 to 90% by weight of an alkoxylation product comprising an alkanol (a) wherein the alkanol (a) has 8 to 12 carbon atoms per molecule and an average number of alkylene oxide units per molecule in the alkoxylation product (A) is in the range of from 35 to 55, the alkylene oxide units are $C_2$-$C_{10}$-alkylene oxide units and the alkanol (a) has an average degree of branching of at least 1; and at least one of (B) 10 to 50% by weight of an alkoxylation product comprising an alkanol (b), wherein the alkanol (b) has 13 to 19 carbon atoms per molecule and an average number of alkylene oxide units per molecule in the alkoxylation product (B) is in the range of from 35 to 55, the alkylene oxide units are $C_2$-$C_{10}$-alkylene oxide units, or (C) 10 to 50% by weight of an alkoxylation product comprising a linear $C_{12}$-$C_{22}$-alkyl alcohol (c), wherein an average number of alkylene oxide units per molecule in the alkoxylation product (C) is in the range of from 35 to 55, the alkylene oxide units are $C_2$-$C_{10}$-alkylene oxide units; or 10 to 50% by weight of (B) and (C) in total.

13. The surfactant mixture according to claim 12, wherein the alkanol (b) has an average degree of branching of at least 2.

14. The surfactant mixture according to claim 12, wherein the alkylene oxide units are selected independently from the group consisting of ethylene oxide units and propylene oxide units.

15. The surfactant mixture according to claim 14, wherein a fraction of the ethylene oxide units to the total number of the alkylene oxide units for the alkoxylation product is at least 0.5.

16. The surfactant mixture according to claim 12, wherein the alkanol (a) has 9 to 11 carbon atoms.

17. The surfactant mixture according to claim 12, wherein the linear $C_{12}$-$C_{22}$-alkyl alcohol (c) has 12 to 18 carbon atoms.

18. The surfactant mixture according to claim 12, wherein the alkanol (b) has an average degree of branching of from 2.2 to 4.

19. A method for producing the surfactant mixture according to claim 12, the method comprising:

mixing the alkanol (a) with the alkanol (b) or the linear $C_{12}$-$C_{22}$-alkyl alcohol (c), thereby forming a mixture and alkoxylating the mixture, optionally in the presence of a catalyst.

20. The surfactant mixture according to claim 12, wherein the surfactant mixture comprises 50 to 80% by weight of (A) and at least one of 20 to 50% by weight of (B) or 20 to 50% by weight of (C).

* * * * *